United States Patent [19]

Stroz et al.

[11] Patent Number: 4,758,438

[45] Date of Patent: Jul. 19, 1988

[54] SWEETENER COMPOSITION

[76] Inventors: John J. Stroz, 110 Radtke Rd., Randolph, N.J. 07869; Abraham I. Bakal, 10 Stafford Rd., Parsippany, N.J. 07054; Ronald P. D'Amelia, 1 Fox Pl., Hicksville, N.Y. 11801

[21] Appl. No.: 918,403

[22] Filed: Oct. 14, 1986

[51] Int. Cl.4 .................. A23G 3/30; A23L 1/236
[52] U.S. Cl. ........................................ 426/3; 426/96; 426/548; 426/804
[58] Field of Search .............. 426/96, 548, 3-6, 426/804

[56] References Cited

U.S. PATENT DOCUMENTS 3,667,969  6/1978  Kracauer ..................... 426/548
4,001,455  1/1977  La Via ........................ 426/548
4,096,285  6/1978  Burge et al. ................. 426/548
4,122,205  10/1978 Burge et al. ................. 426/548
4,228,198  10/1980 Burge et al. ................. 426/548

FOREIGN PATENT DOCUMENTS 3329764  2/1985  Fed. Rep. of Germany.

Primary Examiner—Jeanette Hunter

[57] ABSTRACT

A sweetener composition consisting essentially of co-dried thaumatin, and/or monellin and acid saccharin and designed for use as a non-caloric sweetener in comestibles such as chewing gum to provide prolonged sweetness without aftertaste of either the protein or the acid saccharin.

19 Claims, 2 Drawing Sheets

1

SWEETENER COMPOSITION

BACKGROUND OF THE INVENTION

1. Field of the Invention

The present invention relates to a sweetener composition which is a codried composition consisting essentially of saccharin and a protein selected from the group consisting of thaumatin, monellin and mixtures thereof. The sweetener is especially designed for use in comestible compositions which require prolonged release of sweetness values in the oral cavity of the user thereof.

2. Description of the Prior Art

Thaumatin, or talin, is a proteinaceous material obtained from the fruit of *Thaumatococcus danielli*. Monellin is another proteinaceous material, and it is obtained from the fruit of *Dioscoreophyllum cumminsii*. (Serendipity Berry) (U.S. Pat. Nos. 4011206; 4300576; 4412984; 4562076).

Thaumatin and monellin, as well as acid saccharin, have been proposed for use as sweetening agents in various types of comestibles including chewing gum. See in this regard, for example, U.S. Pat. Nos. 4096285; 4122205; 4228198; 4292336; 4300576; 4412984 and 4562076.

When each of these sweetener materials is used alone in the core of a comestible such as chewing gum at the levels of use for such materials which have been disclosed by the prior art, i.e., about 100 to 300 ppm, or about 0.01 to 0.03%, in the case of thaumatin; about 250 to 750 ppm, or about 0.25 to 0.75%, in the case of mohellin; and about 1000 to 5000 ppm, or about 0.1 to 0.5%, in the case of acid saccharin, they tend to provide undesirable lingering aftertastes in the mouths of the user thereof. A sweet aftertaste in the case of thaumatin and monellin, and a bitter aftertaste in the case of acid sweetener.

It has also been proposed to use the protein and saccharin together, as sweeteners, in comestible such as chewing gum, either individually or when combined with a carrier. In all of such cases, however, the protein is used at a relatively high level, with respect to the amount of saccharin used. U.S. Pat. Nos. 4096285 and 4122205, for example, disclose the use of thaumatin and/or monellin and saccharin in a 1-4:5-20 weight ratio. The compositions of these patents also require the use of a sweetness or taste modifier with the thaumatin and saccharin to reduce or eliminate any aftertaste associated with the sweetening agents. The compositions of U.S. Pat. Nos. 4096285 and 4122205 may also be spray dried on a carrier such as maltodextrin.

U.S. Pat. Nos. 4228198 and 4292336 disclose the use of codried admixtures of thaumatin and/or monellin with saccharin and a carrier such as arabino-galactan or gelatin. In such compositions the thaumatin and/or monellin and saccharin are used at weight ratios to each other of about 1-4:10. The arabinogalactan of U.S. Pat. No. 4,228,198 is used, in part, to minimize sweetness duration and aftertaste. The gelatin of U.S. Pat. No. 4292336 is used to promote the heat stability of peptide sweeteners such as monellin and thaumatin.

Thus, the use of the relatively high amounts of these proteins and/or saccharin provide undesirable aftertaste problems and require that, in order to avoid such problems, such sweeteners, heretofore, when used together have usually had to be used with sweetness modifying compounds of one type or another, and at relatively high ratios of the protein to the saccharin.

Thus, prior to the present invention it has not been possible to effectively use these proteins together with acid saccharin at a low weight ratio of the protein to the acid saccharin and without the need for any additional sweetness modifying compound and/or carrier therefor.

An object of the present invention, therefore, is to provide a means for employing the proteins thaumatin and monellin and mixtures thereof at relatively low levels of usage with acid saccharin while still obtaining relatively prolonged flavor release therefor, and avoidance of any undesirable aftertaste therefrom.

A further object of the present invention is to provide a means for employing acid saccharin and/or soluble forms of saccharin, such as the sodium, calcium or potassium salts thereof, and mixtures thereof with thaumatin and monellin and mixtures thereof, without encountering aftertaste problems normally associated with the use of saccharin.

Another object of the present invention is to provide for a means for employing these, protein sweetness in comestibles such as chewing gum where the proteins do not lose their aftertaste masking characteristic and their sweetness even though they are incorporated in the chewing gum.

SUMMARY OF THE INVENTION

It has now been found, according to the present invention, that thaumatin, monellin or mixtures thereof can be effectively used in comestibles such as chewing gum at relatively low concentrations as flavor enhancers and/or as sweeteners, and with saccharin at relatively low weight ratios of the protein to the saccharin if the protein is codried or otherwise encapsulated with only the saccharin.

DESCRIPTION OF THE PREFERRED EMBODIMENT

Figure 1:
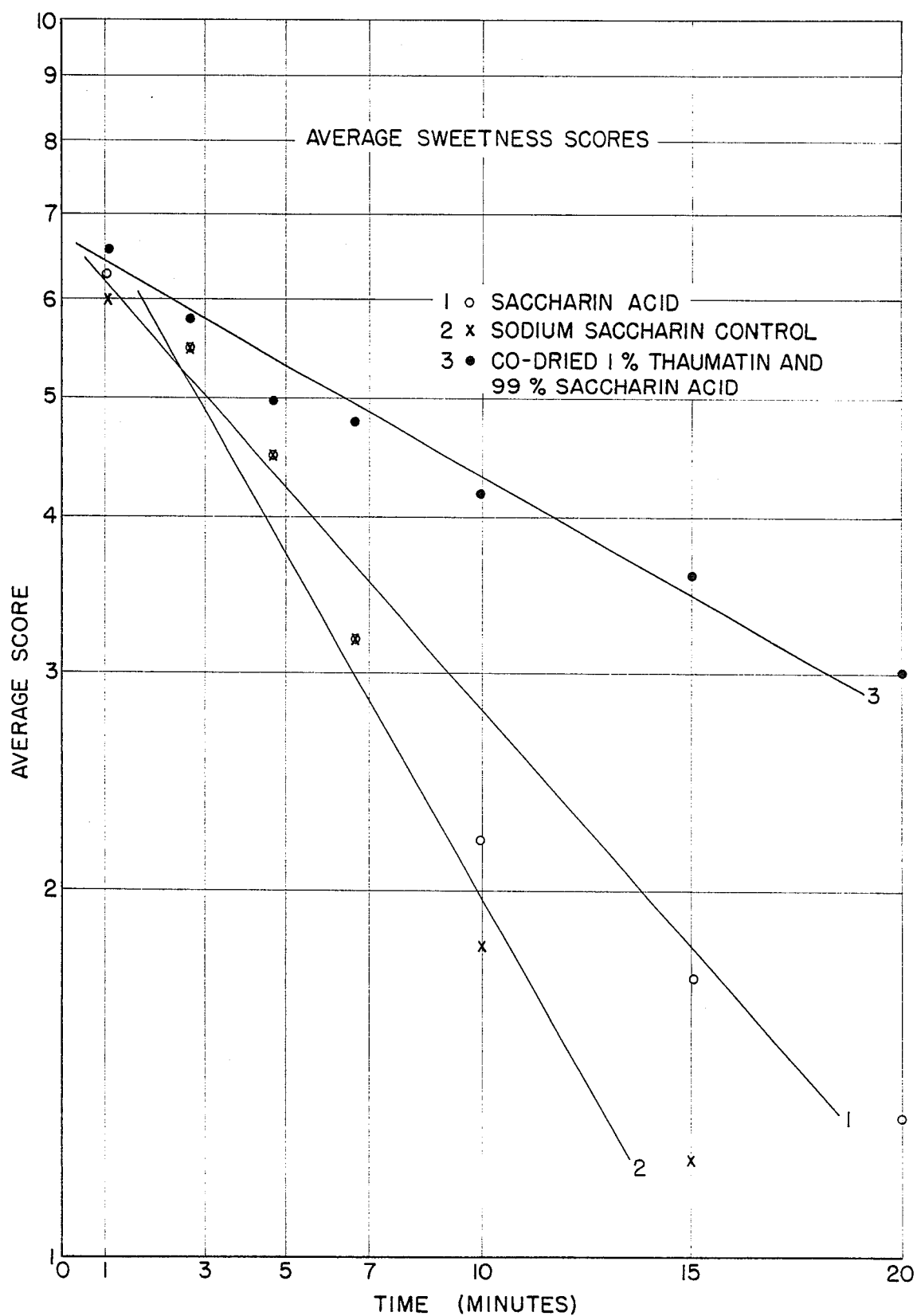
FIG. 1 is a graph depicting the plotting of test scores vs time relative to the sweetness test scores of various chewing gum products of the Examples.

The term "The Protein" as used hereinafter means thaumatin, or monellin, or an admixture of the two materials. According to the present invention The Protein and saccharin are used to form what is believed to be a novel composition, that is, a codried composition consisting only of about 0.1 to 5, and preferably about 0.5 to 3, weight percent of The Protein and about 99.9 to 95, and preferably about 99.5 to 97 weight % of the saccharin. The Protein and the saccharin are thus used to form this composition in a weight ratio of The Protein to the saccharin of about 0.001:1 and preferably of about 0.01:1.

The codried composition is prepared by dissolving the desired weight ratios of The Protein and the saccharin in a suitable cosolvent such as ethyl alcohol, methanol, propylene glycol, acetone, glycerol and water, or miscible mixtures thereof, to form a solution of the two materials and then drying the solution so as to disperse The Protein on the saccharin which then intimately combines with the protein. To be useful as a cosolvent in this regard the solvent must be capable of concurrently dissolving each of The Protein and the saccharin at room temperature and in a concentration of at least 0.2 grams/100cc. The drying operation can be conducted by freeze drying the solution at temperatures below the freezing point of the solvent, or by spray or drum drying the solution at moderate temperatures of about 180° to 200° F. (the temperature of the product), and below the decomposition points of The Protein and the saccharin.

The dried composition is a particulate material having an average particle size of up to about 200 microns, depending on the manner in which it is made.

Since The Protein as well as the saccharin are essentially non-caloric in nature, the composition thereof provides an essentially non-caloric high intensity sweetener composition.

The dried composition may be used as a non-caloric sweetener in various comestible products, particularly those of a chewy nature such as chewing gum, taffy, toffee, chewable mint candies, cream filling for candy and the like.

When the composition of the present invention is used as a sweetening agent it is believed that the saccharin therein acts as primary sweetening agent and that The Protein acts primarily as a flavor enhancer. About 0.05 to 5, preferably about 0.1 to 3, and most preferably about 0.1 to 2, weight % of the codried composition is used to sweeten the comestible products in which it is used. The codried composition would be added to the comestible product at the point in time when an intense sweetener would otherwise be added thereto based on the current state of the art of manufacturing such comestible products. It may be admixed into such product or it may be coated or dusted on one or more of the outer surfaces thereof.

The preferred comestible products in which the sweetener composition of the present invention may be used are chewing gum products. The chewing gum and other chewy confection compositions of the present invention comprise about 5 to 50 ppm of the protein and about 500 to 4000 ppm of the saccharin.

The chewing gum compositions contemplated by the present invention comprise all types of sugar and sugarless chewing gums and chewing gum formulations known to those skilled in the art, including the regular gum, and the bubble gum types. Typical chewing gum compositions comprise a chewing gum base, a modifier, a bulking agent or sweetener, and one or more other additives such as, flavoring agents, colorants and antioxidants. The modifying agents are used to soften, plasticize and/or compatibilize one or more of the components of the gum base and/or of the formulation as a whole.

The chewing gum products of the present invention would have the following general formulation:

| COMPONENT | WEIGHT % OF COMPONENT | |
|---|---|---|
| | BROAD RANGE | PREFERRED RANGE |
| gum base | 15 to 35 | 20 to 30 |
| gum base modifier | 0 to 5.0 | 0.3 to 3.0 |
| bulk sweetener | 0 to 90 | 40 to 65 |
| codried sweetener of present invention | 0.05 to 0.5 | 0.1 to 0.3 |
| coloring agent | 0.05 to 0.40 | 0.15 to .25 |
| other flavoring agent(s) | 0.5 to 2.5 | 0.8 to 1.2 |
| fillers | 0 to 35 | 0 to 30 |
| glycerin | 0 to 30 | 0 to 15 |
| Total | 100 | 100 |

GUM BASE

The composition of the gum base will vary depending on whether the gum base is to be used in a chewing gum product which is to be a regular, or non-bubble, gum product or a bubble gum product. For use in making a bubble gum or regular chewing gum product, the following gum base formulations may be used, in accordance with the present invention:

| COMPONENT | WEIGHT % OF COMPONENT IN GUM BASE FOR | | | |
|---|---|---|---|---|
| | BUBBLE GUM PRODUCT | | REGULAR GUM PRODUCT | |
| | Broad Range | Preferred Range | Broad Range | Preferred Range |
| masticatory material | 8–22 | 9–18 | 8–25 | 9–18 |
| plasticizer for masticatory material | 5–35 | 10–20 | 2–30 | 8–20 |
| hydrophilic detackifier | 0–30 | 4–10 | 5–35 | 10–25 |
| plasticizer for hydrophilic detackifier | 0–14 | 0–8 | 1–15 | 3–12 |
| wax | 3–15 | 5–10 | 4–20 | 8–15 |
| mineral filler | 0–35 | 10–22 | 0–35 | 15–30 |
| antioxidant | 0–0.1 | 0.05–0.09 | 0–0.1 | 0.03–0.09 |
| Total | 100 | | 100 | |

The masticatory substances are elastomeric materials which may be synthetic or natural in origin. The masticatory substances of synthetic origin would include styrene-butadiene copolymer (SBR), butyl rubber (which is isobutylene-isoprene copolymer) and polyisobutylene. The natural masticatory substances should include chicle, crown, gum, nispero, balato, jetulong, pendare, perillo, niger, gutta, tunic, leche caspi, sorva and gutta hank kang.

The plasticizer for the masticatory substance should have minimal tackifying properties and will preferably comprise a hydrogenated ester gum, that is a glycerol ester of hydrogenated resin and/or dimerized ester gum. However, other resins may be employed such as pentaerythritol ester gum, polymerized ester gum, polyterpene resin and ester gum.

The hydrophilic-type detackifier is a material which will absorb saliva and would include vinyl polymers having a molecular weight of at least 2000, and preferably of about 2000 to 80,000 or more, such as polyvinyl acetate, polyvinyl butyl ether and copolymers or vinyl esters and vinyl ethers. The plasticizers for the hydrophilic type detackifiers would include lanolin, stearic acid and sodium stearate.

The plasticizers for the hydrophilic type detackifiers would include triacetin, acetylated glycerides and other flavor adjuvants such as ethyl acetate and triethyl citrate.

The waxes which are used serve primarily as compatibilizers. Examples of appropriate waxes are paraffin wax, candelilla wax, carnuba wax, microcrystalline waxes and polyethylene waxes.

The mineral fillers would include calcium carbonate, titanium dioxide, talc, alumina, tricalcium phosphate and mixtures thereof although calcium carbonate is not preferred when saccharin acid is used.

The gum base may also include a softening agent and lubricant combination which may comprise one or more hydrogenated vegetable or animal fats.

The gum base may also include about 0 to about 2.0%, and preferably about 0.1 to about 0.7% of an emulsifier to impart hydrophilic properties to the gum base. Examples of such emulsifiers includes phosphatides such as lecithin, in addition to that used in the gum base modifier, and mono- and diglycerides of these fatty acids and mixtures thereof, with glyceryl monostearate being preferred.

In addition, the gum base may include antioxidants such as butylated hydroxy toluene, butylated hydroxy anisole and propyl gallate.

The chewing gum compositions of the present invention can be sugar based or sugarless. The sugar or sugar substitute used in the compositions of this invention include natural sugars or non-sugar sweeteners. The amount of natural sugars which can be present in the final composition can range from 0 to about 90 weight percent. The amount of non-sugar sweetener which can be used can range from 0 to about 2 weight percent of the final composition. At least one of such sweeteners is employed.

The term "natural sugar" includes one or more sugar containing materials, for example, monosaccharides of 5 to 6 carbon atoms, such as glucose, arabinose, xylose, or sorbose or mixtures of two or more of the foregoing monosaccharides; disaccharides such as sucrose, lactose, maltose or cellobiose; and polysaccharides such as dextrin, or corn syrup solids.

The intense sweeteners include poorly water-soluble, as well as water-soluble sweeteners, such as the free acid form of saccharin, sodium, calcium or ammonium saccharin salts, aspartame (L-aspartyl-L-phenylalanine methyl ester), dihydrochalcones, glycyrrhizin, dipotassium glycyrrhizin, glycyrrhizic acid/ammonium salt, talin, acesulfame K, as well as *Stevia rebandianna* (Stevioside), *Richardella dulcifica* (Miracle Berry), *Dioscoreophylim cumminisii* (Serendipity Berry), free cyclamic acid and cyclamate salts and the like or mixtures of any two or more of the above.

PREPARATION OF CHEWING GUM PRODUCT

The chewing gum products of the present invention are prepared by first separately preparing the gum base. To then prepare either a sugar based or sugarless chewing gum formulation, the gum base for the product is melted, at a temperature about 190° to 250° F., and the other components of the composition are added thereto. The resulting composition is uniformly admixed. This takes about 3 to 7 minutes for commercial sized batches of these formulations. Each of the components is usually separately added to the formulated composition and uniformly mixed in before the next component is added. All of the admixing operations are conducted at temperatures in the range of about 112° to 185° F., and preferably about 125° to 180° F. for a total mixing time, at such temperatures, of about 10 to 20 minutes. The operations do not have to be conducted under anhydrous conditions in preparing the compositions of the present invention, and any amounts of moisture that are normally present in the raw materials that are used in the compositions of the present invention do not usually have to be removed therefrom either prior to, or during, the formulating process.

The following examples are merely illustrative of the scope of the present invention and are not intended as a limitation upon the scope thereof.

EXAMPLE A

Preparation of Sweetening Agents

A series of seven sweetening agent materials were prepared for comparison purposes to demonstrate the utility and unobviousness of the compositions of the present invention. Table I below lists each of such seven compositions, and the procedures used in preparing them. Compositions 2 and 3 are those representing the present invention.

TABLE I

| Sweetening Agent Composition | Procedure Used To Prepare Sweetening Agent Composition |
|---|---|
| 1. Saccharin acid | Passed through 140 mesh screen |
| 2. One percent thaumatin co-dried with saccharin acid | One part by weight thaumatin and 99 parts by weight saccharin acid were dissolved in 200 proof ethyl alcohol. Alcohol evaporated off at 70° C., dried material passed through 140 mesh screen |
| 3. Two percent thaumatin co-dried with saccharin acid | Two parts by weight thaumatin and 98 parts by weight saccharin acid were dissolved in 200 proof ethyl alcohol. Alcohol evaporated off at 70° C., dried material passed through 140 screen |
| 4. One percent thaumatin blended with saccharin acid | One part by weight thaumatin dry mixed with 99 parts by weight saccharin acid and passed through 140 mesh screen |
| 5. Two percent thaumatin blended with saccharin acid | Two parts by weight thaumatin dry mixed with 98 parts by weight saccharin acid and passed through 140 mesh screen |
| 6. Saccharin acid, mannitol/ thaumatin dust | Saccharin acid passed through 140 mesh screen. Gum Sticks (3 grams each) dusted with mannitol/thaumatin mixture with quantity sufficient to delivery 10 ppm thaumatin per 3 gram stick |
| 7. Sodium saccharin | Added as is to chewing gum formulation |

EXAMPLE B

Use of Example A sweetener Compositions in Chewing Gum

Each of the seven sweetener compositions prepared in Example A above were then used to sweeten the same chewing gum product. The chewing gum product employed had the following composition, in each case, except for the composition and/or manner of use of the sweetener composition used therein. The composition of the chewing gum product was as follows:

TABLE II

| Chewing Gum Composition Component | Weight % of Component Employed Formulations | |
|---|---|---|
| | #1-6 | #7 |
| Gum Base, (an SBR elastomer based) | 23.00 | 23.00 |
| Mannitol Powder | 16.00 | 16.00 |
| Sorbitol Powder | 39.00 | 39.00 |

TABLE II-continued

| Chewing Gum Composition Component | Weight % of Component Employed Formulations | |
|---|---|---|
| | #1-6 | #7 |
| Sorbitol Syrup (70% solids) | 20.00 | 20.00 |
| Peppermint Oil | 1.00 | 1.00 |
| Spray Dried Peppermint | 0.50 | 0.50 |
| lecithin | 0.40 | 0.40 |
| Sweetener Composition | 0.20 | — |
| Sodium Saccharin | 0.05 | 0.25 |

The Sweetener Composition used was one of sweetening agent compositions Nos. 1 to 6 prepared as in Example A above. In the case of such sweetener compositions 1 to 5 and 7 they were each blended into the chewing gum formulation as described below. Sweetener composition No. 6 was dusted onto the exterior of sticks of gum otherwise made with the formulation noted above. Sweetener composition No. 7 was used as a control.

A soluble form of saccharin, sodium saccharin, at a level of 0.05 weight %, was also added, as noted above, to each of Formulations 1-6, to provide an up-front initial flavor sweetness.

The 0.25 weight % level of sodium saccharin was used in the control, formulation 7, to provide a noticeable bitter aftertaste for comparison purposes.

EXAMPLE C

Preparation of Chewing Gum Products

Separate chewing gum products were then made with each of the seven sweetener compositions of Example A and the chewing gum formulation of Example B using the following manufacturing procedure.

| Steps In Procedure | Activity in Step |
|---|---|
| 1. | Fully melt gum base to 220° F. Cool to 150° F. |
| 2. | Add mannitol, lecithin and sweetener system and mix 3 minutes. |
| 3. | Add powdered sorbitol and liquid flavor on top. Mix 3 minutes. |
| 4. | Add sorbitol group. |
| 5. | Add spray dried flavor and sodium saccharin. Mix 3 minutes until smooth. |
| 6. | Roll with mannitol to ⅝ to ¾" thick. |

Each formulation was made in the form of about a 2.2 pound or 1.0 kilogram lot, prior to being formed into stick configuration.

EXAMPLE D

Comparative Testing of Chewing Gum Products

Samples of each of the seven products made in Example C above were then concurrently tested, within 30 days after they had been made (and stored at 40% R.H., 85° F.) by a panel of five trained panelists selected for their taste acuity. All of the panelists had previously participated in similar tests and were familiar with the evaluation of chewing gum.

Each panelists received in each tests session a three gram stick of chewing gum coded with a double digit random number. Panelists were asked to evaluate each chewing gum sample at 1, 3, 5, 7, 10, 15 and 20 minutes of chewing for the following attributes:

1. Initial burst (of overall flavor and sweetness)—after 30 seconds of chewing
2 Sweetness
3. Overall flavor
4. Peppermint Flavor level
5. Aftertaste
6. Overall quality Each sample of chewing gum was tested once by each panelist. The panelist was added to evaluate each sample by assigning a rating value over a range of 1 to 8 to the attributes being tested in accordance with the following scale of proposed values for such attributes, and at the end of each interval of test time (as shown in Table III below)

TABLE III

Test Scheme Outline
Numerical Range and Significance of Rating

| | 0 | 1 | 2 | 3 | 4 | 5 | 6 | 7 | 8 |
|---|---|---|---|---|---|---|---|---|---|
| Attribute | none | | slightly perceptible | | definite | | strong | | very strong |
| Sweetness | none | | slightly perceptible | | definite | | strong | | very strong |
| Overall flavor | none | | slightly perceptible | | definite | | strong | | very strong |
| peppermint flavor level | none | | slightly perceptible | | definite | | strong · | | very strong |
| aftertaste | none | | slightly perceptible | | definite | | strong | | very strong |
| overall quality | dislike extremely | | dislike moderately | | neither like nor dislike | | like moderately | | like extremely |

After Comparatively testing each product once, the numerical ratings assigned by the panelists to each product were compiled and were as follows, as shown in Table IV.

TABLE IV

| Attribute | Time | 7 | 1 | 2 | 3 | 4 | 5 | 6 | |
|---|---|---|---|---|---|---|---|---|---|
| Initial burst | | 6.8 | 7.0 | 6.8 | 7.3 | 6.6 | 6.6 | 6.9 | LSD = 0.6 |
| Sweetness | 1 | 6.0 | 6.3 | 6.6 | 6.5 | 6.1 | 6.1 | 6.3 | |
| | 3 | 5.5 | 5.5 | 5.8 | 4.8 | 5.1 | 5.4 | 5.1 | |
| | 5 | 4.5 | 4.5 | 5.0 | 3.8 | 4.1 | 4.6 | 4.1 | |
| | 7 | 3.2 | 3.2 | 4.8 | 2.8 | 3.7 | 4.1 | 3.3 | |
| | 10 | 1.8 | 2.2 | 4.2 | 2.2 | 3.1 | 3.1 | 2.4 | |
| | 15 | 1.2 | 1.7 | 3.6 | 2.0 | 2.4 | 2.1 | 2.1 | |
| | 20 | 0.8 | 1.3 | 3.0 | 1.8 | 1.6 | 1.9 | 1.6 | |
| Overall flavor | 1 | 5.2 | 6.5 | 6.4 | 6.3 | 6.3 | 6.1 | 6.4 | LSD = 0.5 |
| | 3 | 5.2 | 6.0 | 6.2 | 5.5 | 5.3 | 5.9 | 5.7 | |
| | 5 | 4.8 | 5.2 | 5.8 | 5.0 | 4.9 | 5.1 | 5.1 | |
| | 7 | 3.8 | 4.5 | 5.6 | 4.3 | 4.4 | 4.7 | 4.6 | |
| | 10 | 3.0 | 3.5 | 5.2 | 3.8 | 4.0 | 4.0 | 4.0 | |
| | 15 | 2.2 | 3.2 | 4.4 | 3.8 | 3.1 | 3.1 | 3.6 | |
| | 20 | 1.8 | 3.0 | 4.0 | 3.5 | 2.9 | 3.0 | 3.0 | |
| Peppermint Flavor Level | 1 | 4.8 | 6.5 | 6.4 | 6.3 | 6.3 | 6.1 | 6.3 | LSD = 0.5 |
| | 3 | 4.5 | 6.0 | 6.2 | 5.7 | 5.3 | 5.9 | 5.6 | |
| | 5 | 4.2 | 5.2 | 5.4 | 5.0 | 4.9 | 5.3 | 5.0 | |
| | 7 | 3.2 | 4.5 | 5.2 | 4.2 | 4.3 | 4.9 | 4.3 | |
| | 10 | 2.8 | 3.7 | 4.8 | 3.7 | 3.9 | 4.0 | 3.9 | |

TABLE IV-continued

| Attribute | Time | 7 | 1 | 2 | 3 | 4 | 5 | 6 | |
|---|---|---|---|---|---|---|---|---|---|
| | 15 | 2.0 | 3.3 | 4.0 | 3.7 | 3.3 | 3.1 | 3.6 | |
| | 20 | 1.8 | 3.0 | 3.8 | 3.5 | 2.9 | 2.7 | 3.3 | |
| Aftertaste | 1 | 3.2 | 0.0 | 0.0 | 0.2 | 0.1 | 0.3 | 0.1 | LSD = 0.6 |
| | 3 | 3.5 | 0.0 | 0.0 | 0.0 | 0.0 | 0.1 | 0.1 | |
| | 5 | 2.5 | 0.0 | 0.0 | 0.0 | 0.0 | 0.1 | 0.1 | |
| | 7 | 2.5 | 0.0 | 0.0 | 0.0 | 0.0 | 0.1 | 0.0 | |
| | 10 | 2.0 | 0.2 | 0.0 | 0.2 | 0.0 | 0.3 | 0.0 | |
| | 15 | 2.5 | 0.5 | 0.2 | 0.2 | 0.1 | 0.6 | 0.3 | |
| | 20 | 2.8 | 0.5 | 0.2 | 0.3 | 0.4 | 0.7 | 0.4 | |
| Overall | 1 | 3.8 | 7.0 | 6.6 | 6.8 | 6.6 | 6.6 | 6.4 | LSD = 0.8 |
| Quality | 3 | 3.8 | 6.8 | 6.4 | 6.3 | 6.3 | 6.3 | 6.1 | |
| | 5 | 3.8 | 6.3 | 6.0 | 6.2 | 6.1 | 5.9 | 5.7 | |
| | 7 | 3.8 | 5.5 | 5.8 | 5.7 | 5.6 | 5.6 | 5.0 | |
| | 10 | 3.5 | 5.3 | 5.8 | 5.2 | 5.3 | 5.0 | 4.6 | |
| | 15 | 3.0 | 5.2 | 5.4 | 5.2 | 4.7 | 4.3 | 4.1 | |
| | 20 | 2.5 | 5.0 | 5.2 | 5.0 | 4.6 | 4.3 | 4.1 | |

7 — Sodium saccharin control
1 — saccharin acid
2 — 1% Talin co-dried with 99% saccharin acid
3 — 2% Talin co-dried with 98% saccharin acid
4 — 1% Talin mixed with 99% saccharin acid
5 — 2% Talin mixed with 98% saccharin acid
6 — Dusted with Talin containing mannitol
LSD — Least Significant Difference at 95% confidence level The results of these tests indicate that:

The chewing gums made with saccharin (sample 7) lost their sweetness after about 10 to 15 minutes of chewing. These gums contained a high concentrations of sodium saccharin (0.25 percent), whereas current gums contain approximately 0.1 percent. In addition, this gum received a low flavor score after 10 minutes and significantly high aftertaste score throughout the 20 minute chewing period.

The chewing gums containing saccharin acid and thaumatin mix (samples 4 and 5) had slightly longer lasting sweetness than the saccharin acid gums. No difference was noted in terms of flavor intensity.

The chewing gums dusted with thaumatin and mannitol (sample 6) received similar sensory scores to gums with saccharin acid mixed with thaumatin.

Both chewing gums containing thaumatin co-dried with saccharin acid (samples 2 & 3) were rated significantly higher in overall flavor and in peppermint flavor level. Sample 2, containing 1% thaumatin co-dried with 99% saccharin acid received significantly (at the 95% confidence level) higher sweetness scores, especially after 10 minutes and more of chewing.

Sweetness and flavor curves follow classical decay functions of the general form:

$A = A_\circ e^{-at}$; where:

A = Average score at any time
A = Average score at zero time
a = Slope
t = chewing time FIG. 1 shows the sweetness curves for sodium saccharin, saccharin acid and saccharin acid co-dried with thaumatin. The data indicate that the equations describing the best fit lines are as follows:

For sodium saccharin gum $A = 7.8\ e^{-0.139}$
For saccharin acid gum $A = 6.8\ e^{-0.0887t}$
For thaumatin co-dried with saccharin acid gum $A = 6.7\ e^{-0.0442\ t}$.

Thus, the relative rate of sweetness loss, assuming that sodium saccharin has a value of one (1.0), is 1.6 for saccharin acid and 3.1 for thaumatin co-dried on saccharin acid.

Figure 2:
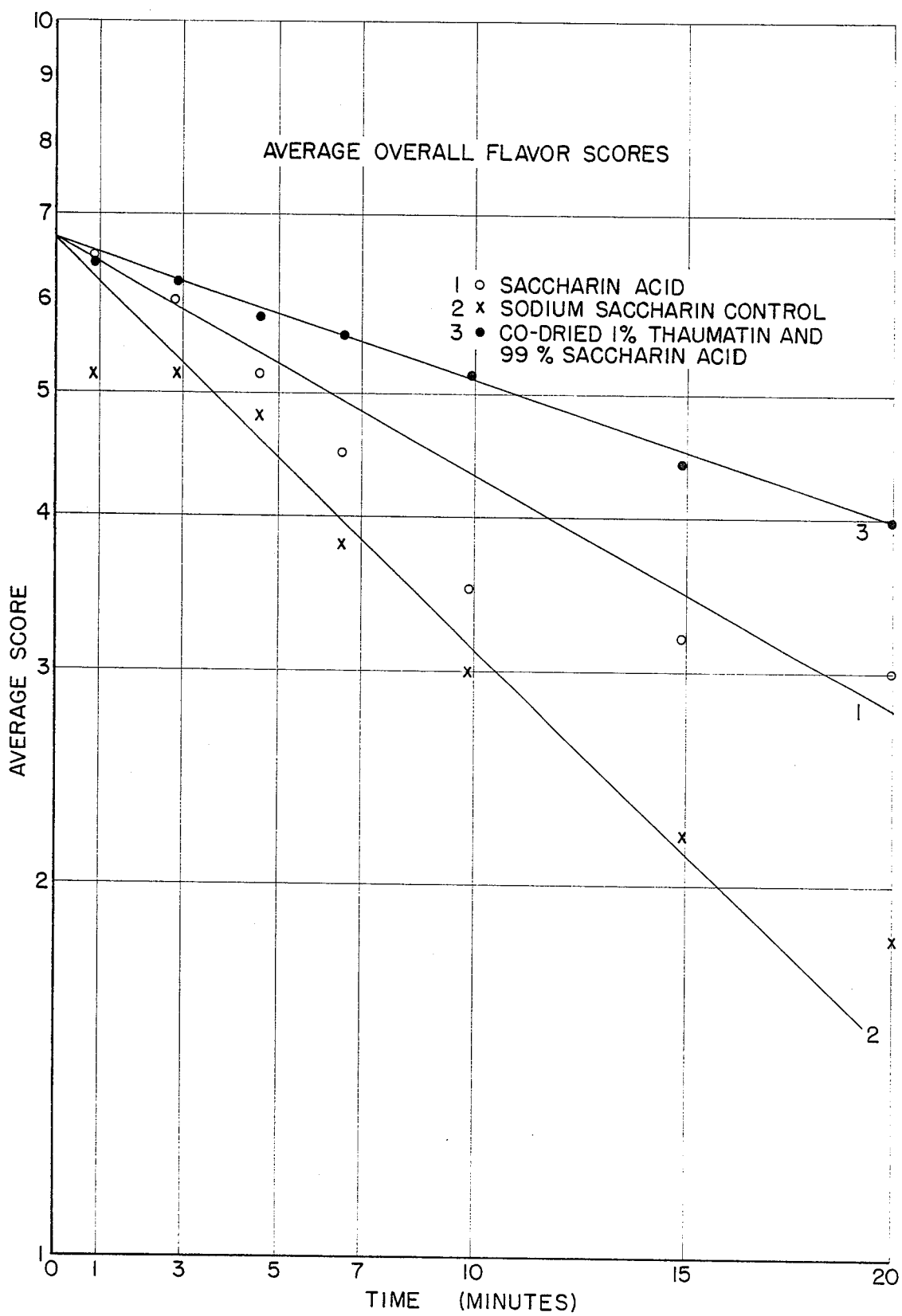
FIG. 2 is a graph depicting the plotting of test scores vs time relative to the overall flavor test scores of various chewing gum products of the Examples.

Data for overall flavor are given in FIG. 2. The best fit lines are as follows:

For sodium saccharin gum $A = 6.75e^{-0.0762t}$
For saccharin acid gum $A = 6.75e^{-0.0428t}$
For thaumatin co-dried with saccharin acid gum $A = 6.75e^{-0.0261t}$ Thus, the relative rate of flavor loss, assuming that sodium saccharin has a value of one is 1.8 for saccharin acid and 2.9 for thaumatin co-dried on saccharin acid.

Based on the data generated in this study, it is concluded that co-drying of thaumatin on saccharin acid significantly improves the sweetness and flavor lasting properties of chewing gums.

The preferred ratio of thaumatin to saccharin acid appears to be 1 to 99, suggesting that thaumatin is somewhat encapsulated by the insoluble saccharin acid. This may also be the reason for the unexpected results for the stability of thaumatin when incorporated into the gum.

In addition to increasing the sweetness lasting properties, thaumatin improves the product by balancing the flavor intensity of the gum. Accordingly, both the flavor and sweetness last for a longer time.

In addition to being useful in comestibles such as chewing gum, as noted above, the sweetener composition of the present invention may also be used in chewing tobacco compositions such as that disclosed in EPA No. 176,280 and in buccals, such as that disclosed in U.S. Pat. No. 4,572,832. The sweetener composition of the present invention would be used in sweetness imparting amounts in such products.

What is claimed is:

1. A sweetener composition consisting essentially of a codried mixture of about 99.5 to 95 weight % of saccharin and about 0.5 to 5 weight % of a protein selected from the group consisting of thaumatin, monellin and mixtures thereof.

2. A composition as in claim 1 in which said protein comprises thaumatin.

3. A composition as in claim 1 in which said protein comprises monellin.

4. A comestible sweetened at least in part with the composition of claim 1.

5. A comestible sweetened at least in part with the composition of claim 2.

6. A comestible sweetened at least in part with the composition of claim 3.

7. A comestible as in claim 4 which is chewing gum.

8. A comestible as in claim 5 which is chewing gum.

9. A comestible as in claim 6 which is chewing gum.

10. Chewing gum as in claim 7 which comprises about 0.05 to 5 weight % of said composition.

11. Chewing gum as in claim 8 which comprises about 0.05 to 5 weight % of said composition.

12. Chewing gum as in claim 9 which comprises about 0.05 to 5 weight % of said composition.

13. Chewing gum as in claim 1 which comprises about 5 to 50 ppm of said protein and about 500 to 4,000 ppm of said saccharin.

14. Chewing gum as in claim 2 comprising about 5 to 50 ppm of said protein and about 500 to 4,000 ppm of said saccharin.

15. In a process for sweetening a comestible with an essentially non-caloric sweetening agent the improvement which comprises employing as said sweetening agent the composition of claim 1.

16. A process as in claim 15 in which said protein is thaumatin.

17. A process as in claim 15 in which said protein is monellin.

18. A process for preparing the composition of claim 1 which comprises dissolving said protein and said saccharin in a common solvent therefor and drying the resulting solution so that said acid saccharin functions as a carrier for said protein.

19. A process as in claim 18 which thaumatin and acid saccharin are dissolved in ethyl alcohol.

* * * * *